United States Patent
Klein et al.

(10) Patent No.: US 12,263,424 B2
(45) Date of Patent: Apr. 1, 2025

(54) FILTER DEVICE TOGETHER WITH FILTER ELEMENT

(71) Applicant: HYDAC FILTERTECHNIK GMBH, Sulzbach/Saar (DE)

(72) Inventors: Volkmar Klein, Zweibrücken (DE); Michael Sakraschinsky, St. Ingbert (DE); Stefan Hennes, Neunkirchen (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 425 days.

(21) Appl. No.: 17/642,303

(22) PCT Filed: Jan. 13, 2021

(86) PCT No.: PCT/EP2021/050562
§ 371 (c)(1),
(2) Date: Mar. 11, 2022

(87) PCT Pub. No.: WO2021/156030
PCT Pub. Date: Aug. 12, 2021

(65) Prior Publication Data
US 2022/0339566 A1  Oct. 27, 2022

(30) Foreign Application Priority Data
Feb. 3, 2020 (DE) ..................... 10 2020 000 738.4

(51) Int. Cl.
*B01D 35/30* (2006.01)
*B01D 29/23* (2006.01)

(52) U.S. Cl.
CPC ............. *B01D 35/30* (2013.01); *B01D 29/23* (2013.01); *B01D 2201/295* (2013.01);
(Continued)

(58) Field of Classification Search
CPC .. B01D 35/30; B01D 29/23; B01D 2201/295; B01D 2201/304; B01D 2201/347;
(Continued)

(56) References Cited

U.S. PATENT DOCUMENTS 2,932,400 A * 4/1960 Scavuzzo ............. B01D 36/001
210/136
2004/0237575 A1 12/2004 Stockbower
(Continued)

FOREIGN PATENT DOCUMENTS

| DE | 10 2013 019 807 | 5/2015 |
| DE | 10 2015 007 691 | 12/2016 |

(Continued)

OTHER PUBLICATIONS

International Search Report (ISR) issued Mar. 23, 2021 in International (PCT) Application No. PCT/EP2021/050562.

*Primary Examiner* — Pranav N Patel
(74) *Attorney, Agent, or Firm* — Wenderoth, Lind & Ponack, L.L.P.

(57) ABSTRACT

A filter device for the filtration of fluids has a filter housing (10), which can be closed by a cover (40), and has a filter element (30) accommodated in a replaceable manner in the filter housing. At least one functional element is present on the cover (40) and on the filter housing (10) and on the filter element (30) in such a way that the filtration of the fluid is only possible when all functional elements interact simultaneously.

10 Claims, 4 Drawing Sheets

(52) U.S. Cl.
CPC .. *B01D 2201/304* (2013.01); *B01D 2201/347* (2013.01); *B01D 2201/4092* (2013.01)

(58) Field of Classification Search
CPC ...... B01D 2201/4092; B01D 2201/301; B01D 29/90; B01D 35/306; B01D 35/0276; B01D 2201/291; B01D 2201/4046; B01D 27/08; B01D 2201/4061; B01D 2201/4023; B01D 2201/40; B01D 46/0005; B01D 2201/29; B01D 2201/306; B01D 2313/02; B01D 2265/026; B01D 2313/20; B01D 2313/21; B01D 46/0004; B01D 35/303

See application file for complete search history.

(56) References Cited

U.S. PATENT DOCUMENTS

| | | |
|---|---|---|
| 2005/0178713 A1 | 8/2005 | Stockbower |
| 2006/0278576 A1 | 12/2006 | Stockbower |
| 2009/0229231 A1 | 9/2009 | Treyz |
| 2010/0044295 A1 | 2/2010 | Honermann et al. |
| 2015/0144549 A1* | 5/2015 | Kreibig ............... B01D 29/21 210/435 |
| 2016/0144307 A1 | 5/2016 | Honermann et al. |
| 2020/0188820 A1* | 6/2020 | Bautz ............... B01D 35/027 |

FOREIGN PATENT DOCUMENTS

| | | |
|---|---|---|
| DE | 10 2017 003 489 | 10/2018 |
| DE | 10 2017 004 174 | 10/2018 |
| WO | 03/082435 | 10/2003 |
| WO | 2008/134494 | 11/2008 |
| WO | 2018/134626 | 7/2018 |

* cited by examiner

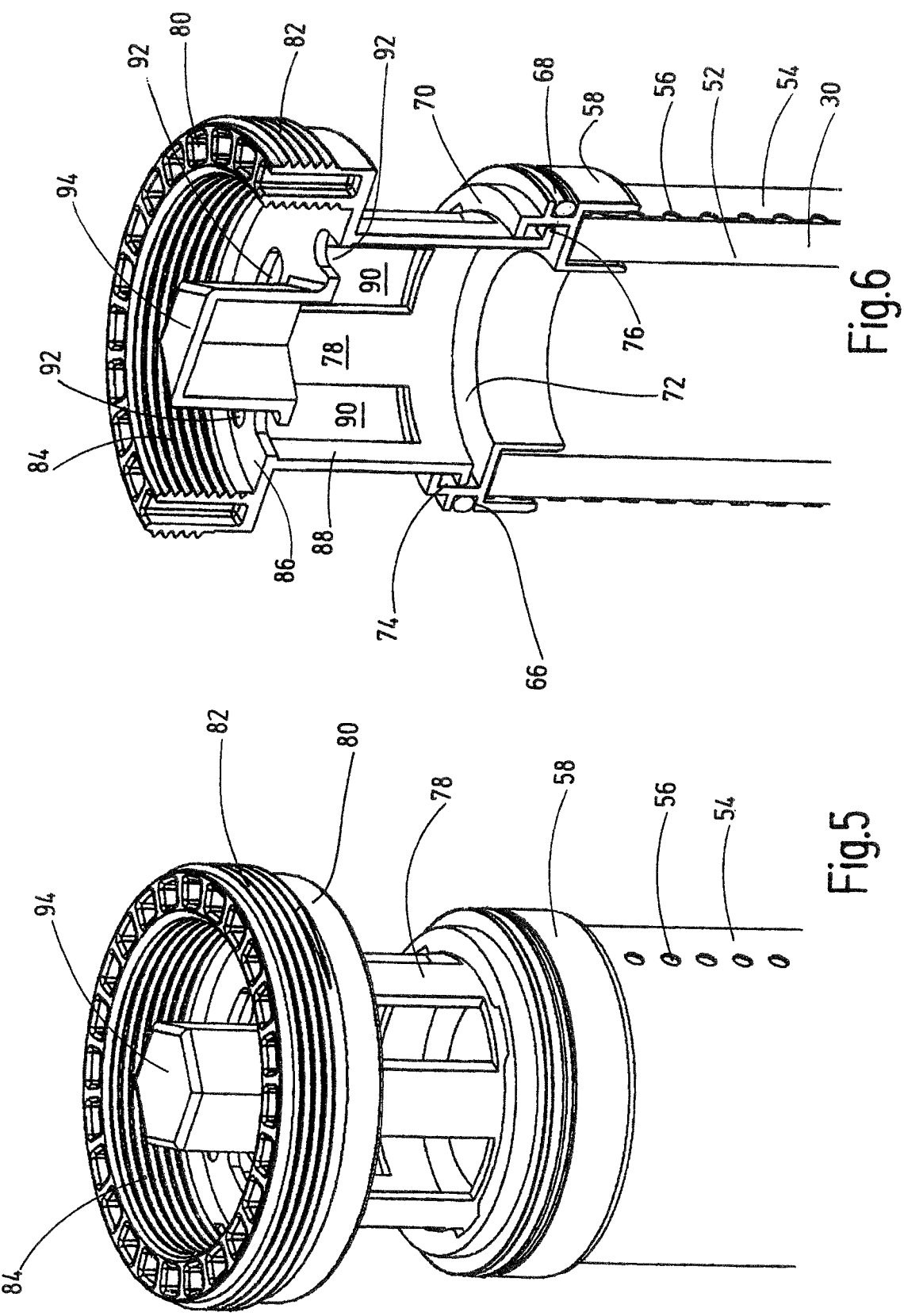

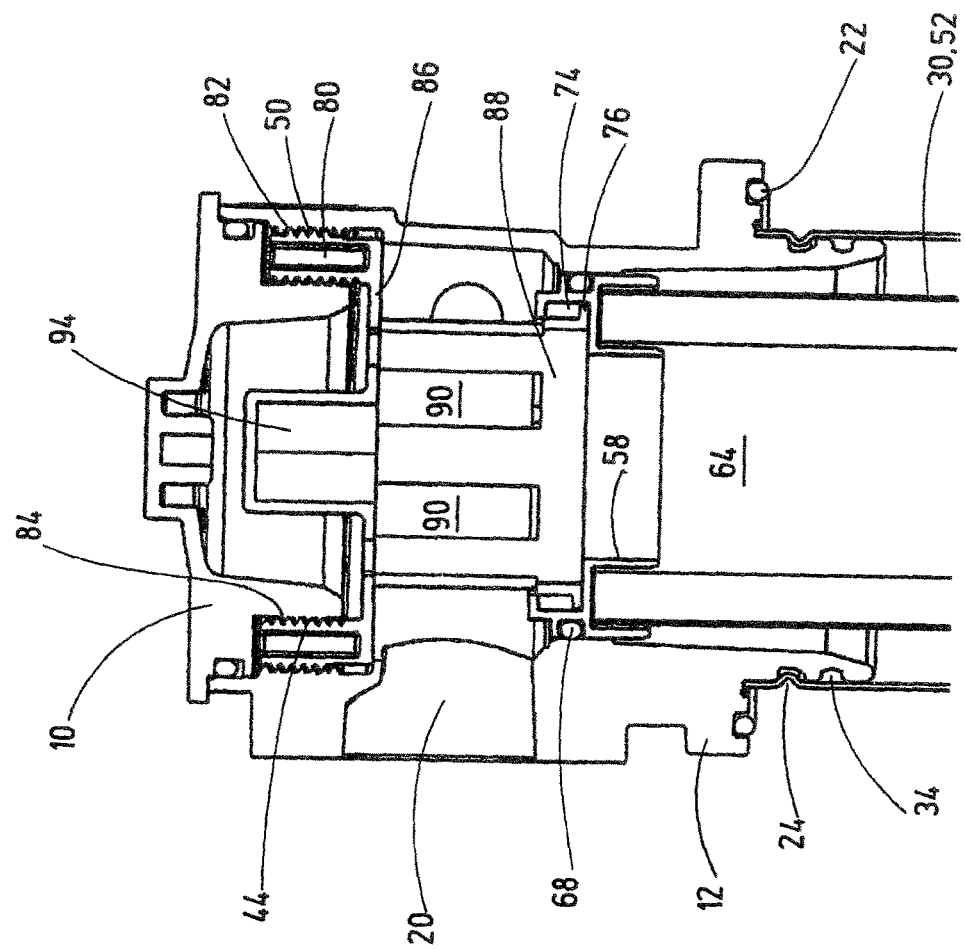
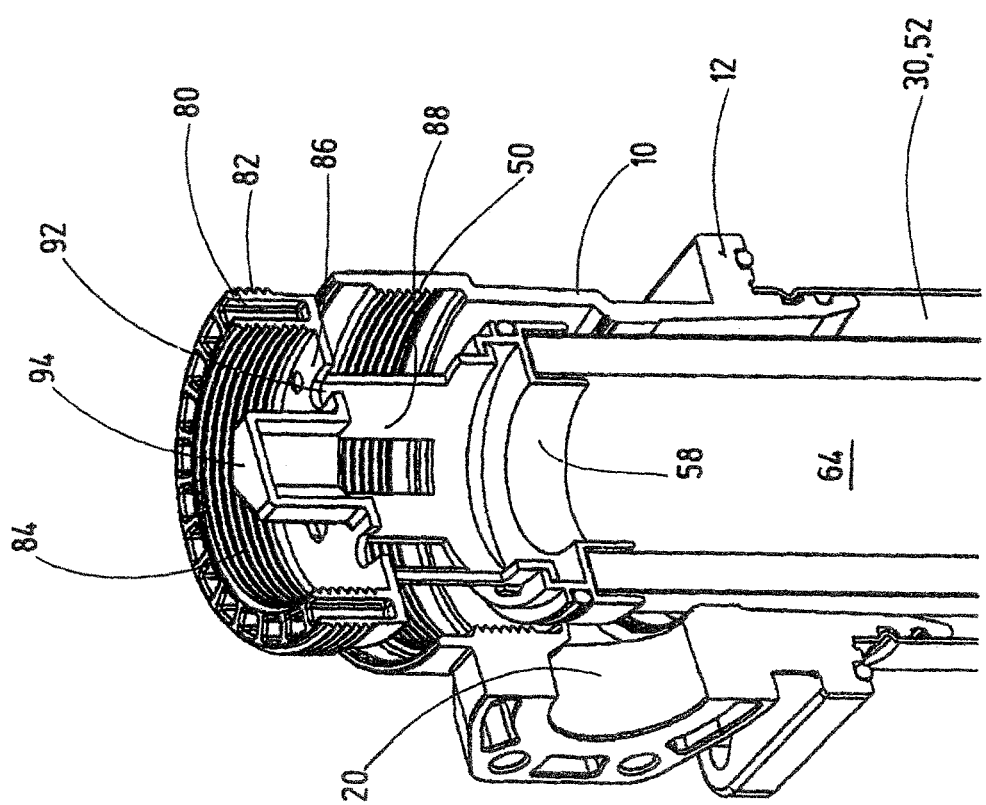

FILTER DEVICE TOGETHER WITH FILTER ELEMENT

FIELD OF THE INVENTION

The invention relates to a filter device for the filtration of fluids, at least having a filter housing, which can be closed by a cover, and having a filter element accommodated in a replaceable manner in the filter housing. The invention further relates to a filter element that can be used for such a filter device.

BACKGROUND OF THE INVENTION

DE 10 2015 007 691 A1 describes a filter device as an in-tank solution having a support part as a component of the filter housing and an interchangeable filter element, which can be accommodated therein. A sealing device acts between the support part or filter housing and the filter element and has a securing device for the detachable connection of the filter housing to the filter element. The securing device has a circumferential collar part and exerts a force on the sealing device under the action of a compression spring as an energy storage. The force seals the filter housing and the filter element from each other in a fluid-tight manner. The filter housing has a further circumferential collar part at least at its end area facing the securing device. The collar part of the securing device is guided concentrically inside the collar part of the filter housing, which is provided with a further sealing system.

Because an axial guide is formed in this way for the component directly transmitting the sealing force, an optimum transmission of the force acting in the axial direction on the filter element is warranted, safeguarding an optimum sealing in this respect. Filtering devices used in this way are typically used for cleaning hydraulic oil in the context of machines and equipment.

To ensure the functionality of such hydraulic machines and equipment including their components, it is often necessary to replace consumables by new products of equivalent quality during maintenance operations after the consumables have been consumed. In the usual time frame of possible warranty claims and goodwill claims to such a maintenance, repair and overhaul operation (MRO) of machines and systems, the latter would like to guarantee to the original equipment manufacturer (OEM) that in the case of maintenance, on the one hand, an original product is used, and on the other hand, that without the actual installation of the original product to be replaced, a restart is reliably omitted, to avoid downstream malfunctions or even failures of the machines or systems because of incorrect or missing components in this way.

A classic application for the approach described above are hydraulic filters, the respective filter elements of which are used to remove particulate contamination from a fluid, such as oil. If the filter element is clogged with dirt, blocking of the fluid typically results, and the used filter element has to be replaced by a new one. Users of such hydraulic filters then often resort to cheap filter elements or even counterfeits, wherein it is sometimes not even apparent to the user that the replacement element is an inferior counterfeit. Today, however, especially in the operation of modern machines and systems and their components, filter elements are subject to more stringent requirements such as filter fineness, pressure stability, durability, insensitivity to electrostatic discharges, surface functionality, etc. For these requirements, a cheap filter element or a counterfeit product typically cannot comply. Accordingly, in practice, complete system failures frequently occur because the replacement filter element is of poor quality compared to an original replacement element of the manufacturer, who typically provides the hydraulic filter and a matching original filter element to the customer (user) as basic or original equipment at the start. Particularly in the case of counterfeit filter elements, which often bear the company name and/or trademark of the original manufacturer or original equipment manufacturer on the product, in the event of damage, the customer asserts recourse claims directly against the original manufacturer, even though the filter element originates from a low-cost supplier or counterfeiter.

Another problem is that in practice the used filter element is often not replaced by a new element, for instance because the replacement procedure is simply forgotten or a suitable replacement element is not available at the time and the machine or system in question, which is only equipped with the housing-sided hydraulic filter, is started up, even if the hydraulic filter is not ready for use at all because the filter element is missing. In this respect, too, massive breakdowns of machinery and equipment can occur.

SUMMARY OF THE INVENTION

Based on this state of the art, the invention addresses the problem of further improving the known solutions to the effect that hydraulic machines and systems can only be operated with a hydraulic filter in which an original filter element is actually inserted.

A filter device and a filter element provided for the filter device according to the invention solve this problem.

Because at least one functional element is present on the cover and on the filter housing and on the filter element in such a way that the filtration of the fluid is only possible when all functional elements interact simultaneously, it is ensured that only a special original filter element is inserted in an interchangeable manner into the filter housing. Under no circumstances, the filter device together with in a fluid-conveying manner connected machines and systems can be started without the original part actually being inserted in its functional position. This is without parallel in the prior art.

In a preferred embodiment, provision is made that the functional elements are formed from preferably continuous threaded sections and that the threaded sections are of identical design, at least in terms of their pitch, between the cover and the filter element and between the filter element and the filter housing, respectively. The corresponding functional elements ensure that only a special original filter element of the original equipment manufacturer can be inserted in the filter housing and that the system or machine can only be started if the cover is operatively connected to or engaged with the filter element when it is inserted by the assigned functional elements, in particular in the form of the threaded sections.

Preferably, provision is further made that one end cap of the filter element, wherein the one end cap faces the cover, bears a locating ring having a functional element, in particular in the form of a threaded section, on its inner and outer circumference each. In this way, the threaded sections for the filter housing and for the cover are unmistakably separated from each other and yet arranged adjacent to each other in a space-saving manner, to prevent operating errors when disassembling and reassembling the filter device for the purpose of replacing the used filter element by a new element.

In a further preferred embodiment of the filter device according to the invention, provision is made that this one end cap having the locating ring has a spacer, which keeps this locating ring at an axial distance from the element material of the filter element. In this way, the locating ring having the threaded sections is axially separated from the other parts of the end cap, which accommodates one end of the element material of the filter element, facilitating the unscrewing and screwing operations for the filter element with respect to the filter housing, while at the same time safely guiding the element material in the filter housing in both opposite directions.

In a further preferred embodiment of the filter device according to the invention, provision is made that the spacer has fluid passages in such a way that unfiltered matter flowing into the filter housing passes into the interior of the filter element. After flowing through the element material from the inside to the outside, the filtered fluid flows to the filtrate side in a clean state. In this way, a uniform inflow of the unfiltered matter onto the element material at the inside of the filter element is achieved via the fluid passages, increasing the separation efficiency for particulate contaminants.

Preferably, provision is also made that the element cap together with the spacer, which is preferably loosely inserted with clearance, and the locating ring has a sealing device on the outer circumference in such a way that, in the replaced operating state of the filter element in the filter housing outside the element material the unfiltered matter side is sealed off from the filtrate side. This arrangement also prevents unfiltered material from unintentionally reaching the filtrate side of the filter device during a replacement process.

Particularly preferably, provision is made that the individual functional elements, which are preferably designed as threaded sections, are arranged concentrically with respect to each other when the device is in the operating state, as viewed to the longitudinal axis of the filter housing. In this way, the threaded sections that can be engaged with each other can be accommodated in a filter head of the filter housing in a space-saving manner, sort of in a common plane, and the actuating forces for interconnecting and disconnecting the parts are low. In addition, the threaded sections are secured with each other in their engagement position in this way, and unintentional disassembly from the outside is prevented.

Preferably, viewed from the inside to the outside, a male thread of the cover is followed by a female thread of the filter element, and a male thread of the filter element is followed by a female thread of the filter housing having their respective individual thread lengths, which for simplified manufacture can also all have the same thread pitch and are formed from only one type of thread.

In a preferred embodiment of the filter device according to the invention, provision is further made that it, designed as an in-tank filter, discharges the unfiltered matter supplied outside of a tank, cleaned by the filter element, as filtrate to the inside of the tank. In-tank filters of this type are available in a wide range of embodiments, so that they can also be used for a variety of applications. It is also possible to replace existing, delivered in-tank filters by the newly designed filter device as needed. However, the application of the filter device according to the invention is not limited thereto.

Particularly preferably, a filter element is also provided, in particular for a filter device as described above, in which the element material has at least one end cap, which, held at an axial distance by a spacer, supports a locating ring having functional elements, in particular in the form of threaded sections, on the inner and outer circumferences.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIGS. 5 and 6 are a partial perspective view and a partial a perspective view in section, respectively, of the upper part of the filter element of FIG. 1;

FIG. 7 is a perspective view in section of the filter device of FIG. 1 with a partially inserted filter element and without cover; and FIG. 8 is a side view of the upper part of the filter device of FIG. 1 with the filter element inserted and the cover inserted, in particular screwed in, in the functional position.

DETAILED DESCRIPTION OF THE INVENTION

Figure 1:
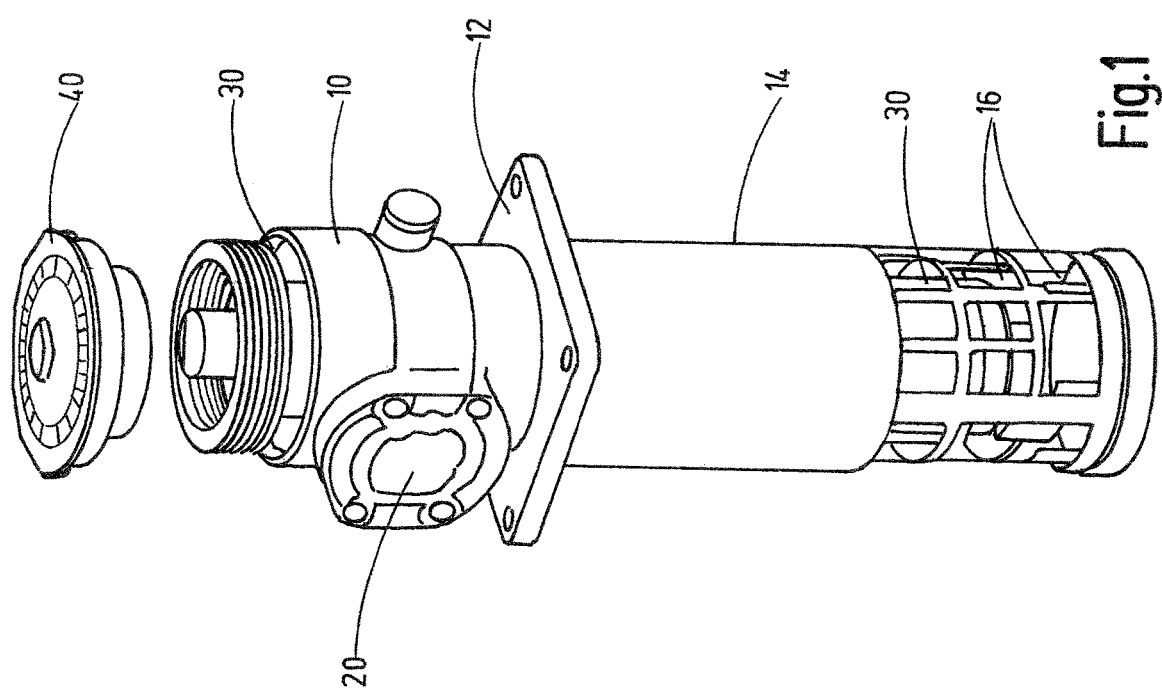
FIG. 1 is an exploded perspective view of a filter device with a filter element partially inserted and a cover lifted off the filter housing according to an exemplary embodiment of the invention.

FIG. 1 shows, in the manner of an exploded view, a filter device as a whole, which is designed as an in-tank solution, according to an exemplary embodiment of the invention. The filter device has a filter housing 10 arranged at the head end, which has a flange plate 12 at the foot end for attaching the filter device to a upper side of a tank wall, in particular a hydraulic oil tank (not shown). The oil tank has a passage opening in this respect, beyond which the flange plate 12 extends for the purpose of inserting the sleeve-shaped, cylindrical wall part 14 of the filter device into the tank. Viewed in the direction of FIG. 1, the wall part 14, which is designed having a thin wall thickness, has at its lower end area window-shaped passage openings 16, which are used for the passage of filtrate from the filter device into the interior of the fluid tank and which are preferably designed in such a way that any gas or air bubbles present in the fluid, can be released to the fluid in the tank without constraint. In the tank, openings 16 rise above the tank fluid level for a degassing process of the fluid. In this respect, provision is preferably made that the passage openings 16 are also located below the respective fluid level in the tank, although this is not mandatory.

The filter housing 10, which in the present embodiment is designed in the manner of a filter head, encompasses an interior space 18 (see FIG. 2), into which a fluid port 20 opens radially from the outside for the purpose of supplying unfiltered matter originating from a hydraulic circuit (not shown) of a hydraulic system or the machine. The filter housing 10 is formed as a cast part, and both the flange plate 12 and the fluid port 20 are integral parts of the filter housing 10. At the underside of the flange plate, 12 a circumferential ring seal 22 is arranged, which also seals the interior of the tank from the environment while the filter device is installed in the tank.

Flared laps 24 are used to attach the upper end area of the cylindrical wall part 14, which essentially forms a closed shell, to the filter housing 10, and to a closing part 26 arranged at the lower end. The plate-shaped closing part 26 closes off a receiving space 28 of the wall part 14, viewed in the direction of FIG. 3, downwards with respect to the interior of the tank. Because the wall part 14 having the receiving space 28 is used to receive a filter element 30, the wall part 14 can still be considered as a component of the overall filter housing 10 in that regard.

At the outer circumference, the upper flared laps 24 extend along the entire circumference of the filter head, and to establish the flared connection, the filter housing 10 has an abutment ring 32 projecting downwards, which abutment ring 32 bears a further ring seal 34 at its lower free end and below the upper flared laps 24. The plate-shaped closing part 26 also has an annular seal 36 located below the lower flared laps 24, wherein the annular seal 36 seals the interior of the receiving space 28 from the tank environment in this connection area. At the connecting webs between the passage openings 16, spacers 38 (FIG. 3) are arranged, which hold the filter element 30 in position along its lower end area and at a predeterminable radial distance from the inside of the shell-shaped wall part 14.

Figure 4:
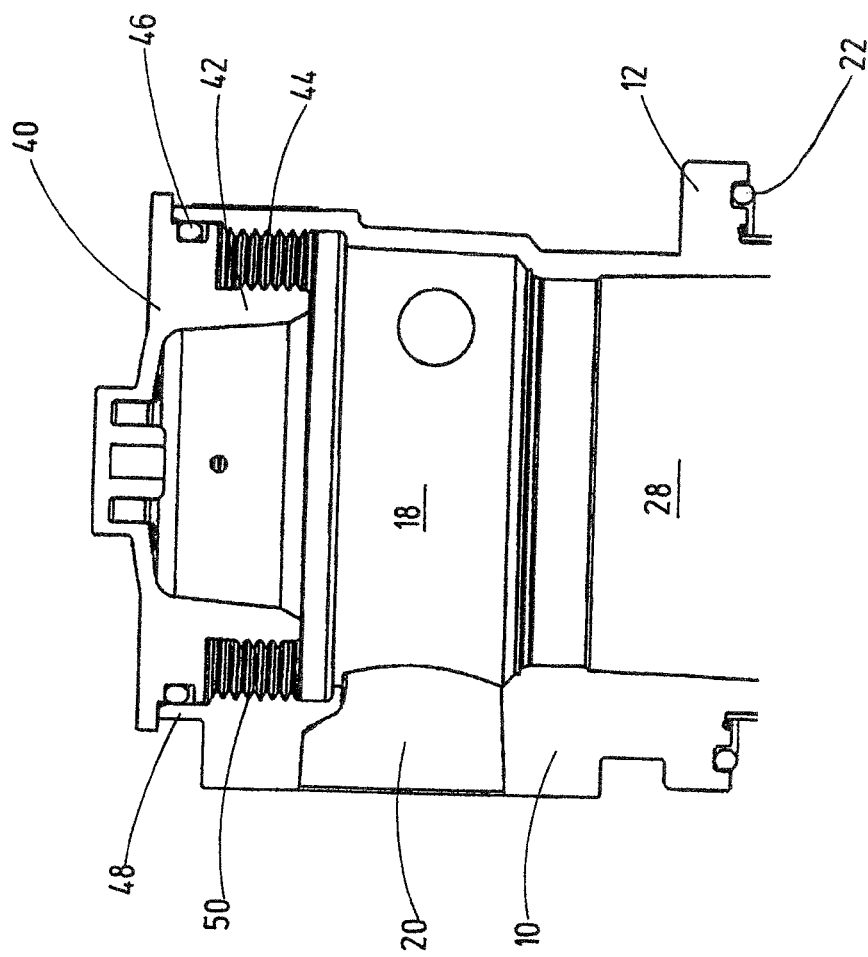
FIG. 4 is a side view in section of an upper subsection of the filter device shown in FIG. 3.

The interior 18 of the filter housing 10 is open at the top and can be closed by a cover 40. As shown in particular in FIG. 4, the cover 40 has a bar-shaped threaded ring 42 projecting downwards in the direction of the interior 18. The male thread 44 of the threaded ring 42 forms a functional element in that way. In the illustration of FIG. 4, the cover 40 is shown in its installation situation inserted into the filter housing 10, wherein the cover 40 is only loosely inserted and is more or less loosely supported by an annular seal 46 while bearing against an annular attachment connection 48 of the filter housing 10. As can further be seen in FIG. 4, at the same height but at a radial distance on the inside of the head-shaped filter housing 10, a female thread 50 is arranged as a further functional element, which female thread 50 opens out in the direction of the upper free end of the filter housing 10 below the attachment connection 48 into the surroundings. In the functional position shown in FIG. 4, without any inserted filter element 10, when the filter device is put into operation the cover 40 would lift off from its sealing seat on the attachment connection 48 even at very low operating pressures, such as occur when a machine or system is started up, and immediate leakage and pressure loss would occur, which would not go unnoticed during operation. In this way, the solution according to the invention ensures that in any case a sensible start-up is only possible if a suitable original filter element 30 is actually inserted in the filter device with its filter housing 10.

Figure 2:
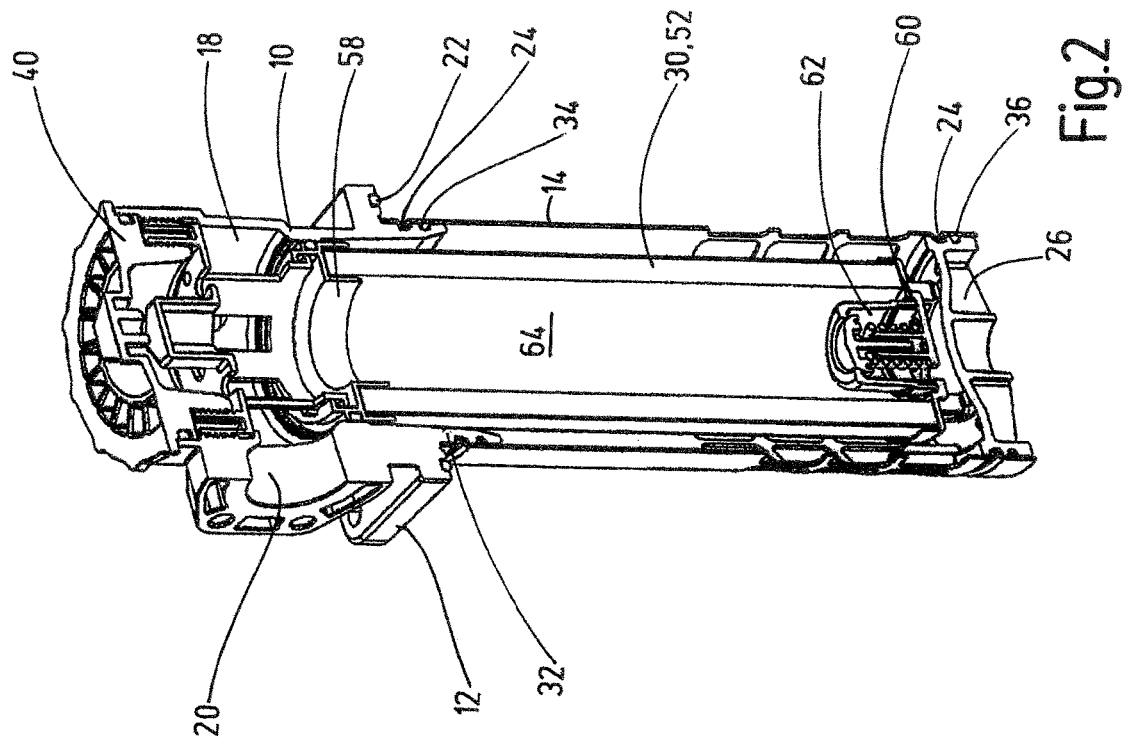
FIG. 2 is a perspective view in section of the filter device according to FIG. 1.

For a detailed explanation of the filter element 30, reference is also made in particular to FIGS. 2 and 5-6. The filter element 10 has an element material 52 that is preferably pleated (not shown). The element material 52 is typically used to clean particulate contaminants from a fluid, such as oil, wherein a stream of unfiltered matter flows through the element material 52 from the inside to the outside during the operation of the filter device. With regard to the direction of flow referred to, on the outer circumference the element material 52 is surrounded by a cylindrical support tube 54 (FIGS. 5, 6), which is provided with a perforation 56 for the passage of fluid, wherein for the sake of simplicity not all the passage openings are shown in the figures. In particular, as shown in FIG. 2, the element material 52 is sandwiched between an upper end cap 58 and a lower end cap 60. The lower end cap 60 has a bypass valve 62 as an integral component, which is customary in hydraulics and which opens when the element material 52 is clogged above a predetermined differential pressure and connects the interior 64 of the filter element 30 directly to the interior of the tank, bypassing the element material 52, to enable the continued operation even when the filter element 30 has failed or is blocked. On the filtrate downstream end of the filter element 30, a radial clearance is provided between the wall part 14 and the element material 52 so as to allow the undisturbed flow of the filtrate to the tank interior via the window-shaped passage openings 16 in the wall part 14. Preferably, the axial length of the filter element 30 is selected such that its lower end cap 60 can be placed in contact with the closing part 26, which is designed as a base plate, without clearance.

Viewed from above in the direction of FIG. 6, the upper end cap 58 encompasses the upper end of the element material 52 in a U-shaped manner and is, for instance, firmly connected to the element material 52 and the support tube 54 arranged on the outer circumference by a conventional adhesive bond. A ring seal 68 is arranged in an engagement groove 66 arranged above, which separates the filtrate side from the unfiltered side of the filter device in a media-tight manner when the filter element 30 is installed (see FIG. 2). Above, there is an annular perimeter rim 70 angled inwards at 90 degrees, is an integral part of the end cap 58 (FIG. 6). The perimeter rim 70 forms an engagement space 74 with the top surface 72, viewed in an axial direction in parallel to the longitudinal axis of the filter device. With the engagement space 74, an engagement rim 76 of a spacer 78, projecting from the foot end, is engaged. For a spacer 78 attached to the filter housing 10, the filter element 30 can be moved in parallel to the longitudinal axis of the filter device along a predeterminable axial path, to compensate for tolerances, for instance if the manufacturing length for the filter element 30 cannot be precisely maintained or if, for instance, temperature-related changes in length occur at the filter element 30.

The upper free end of the spacer 78 is provided with a locating ring 80, which has a male thread 82 on the outer circumference and a female thread 84 on the inner circumference as further functional elements. The locating ring 80 may have individual hollow chambers between the threaded sections 82, 84 and is secured to a hollow cylindrical wall part 88 of the spacer 78 by an annular plate 86. The spacer 78 holds the locating ring 80 including the annular plate 86 at an axial distance above the outwardly projecting engagement rim 76. In turn, window-shaped fluid passages 90 are again provided in the wall part 88 of the spacer 78. Likewise, the annular plate 86 extending transversely to the longitudinal axis of the filter element 30 has such passages 92, all of which permit an unobstructed fluid flow into the interior 64 of the filter element 30 via the fluid port 20.

Furthermore, a polygon 94 projecting upwards, in particular in the form of a hexagon, is provided centrally on the upper end of the ring plate 86, wherein the polygon 94, when the cover 40 is lifted off, enables the engagement of an actuating tool, not shown in greater detail, which can be used to bring the male thread 82 of the locating ring 80 into male engagement or female engagement with the associated female thread 50 of the filter housing 10. During this rotational movement in the course of an unscrewing process, the engagement rim 76 of the spacer 78 then rotates freely in the engagement space 74 of the upper end cap 60, and the filter element 30 is only inevitably lifted out of the filter housing 10 having the wall part 14 in a rotational position, in which the engagement rim 76 comes into axial contact with the perimeter rim 70 of the end cap 58, wherein the friction of the sealing ring 68, which wall-sided bears against the inside of the filter housing 10 below the fluid port 20, has to be overcome. In the reverse case, that is when the filter element 30 is screwed in, the engagement rim 76 presses the filter element 30 downwards after overcoming the play when it is in axial contact with the upper end 72 of the end cap 58 until it takes up its intended functional position in the filter housing 10. In this way, a particularly simple replacement process is feasible for the filter element 30 and it cannot 'stick' to the filter housing 10 in such a way that it cannot be replaced without obstruction.

During an insertion process of the filter element 30 into the filter housing 10, first, as shown in FIG. 7, the filter element 30 is inserted axially downwards into the filter housing 10, viewed in the direction of FIG. 7, until the start of the threaded section 82 on the outer circumference comes into incipient engagement with the female thread 50 of the filter housing 10. The polygon 94 is used for the screwing-in process until the complete screwing-in position for the filter element 30 in the filter housing 10 shown in FIGS. 2 and 8 has been reached.

Then the male thread 44 of the cover 10 is screwed into the female thread 84 on the locating ring 80 of the filter element 30 until, once again, the complete installation situation shown in FIGS. 2 and 8 is achieved, in which the cover 40 closes off the filter device at the top. Because of the specially designed functional elements in the form of the threaded sections 50, 82, only a special original filter element 30 can be inserted into the filter device housing 10, counteracting the replacement of an original filter element 30 with a cheap element or counterfeit product.

Figure 3:
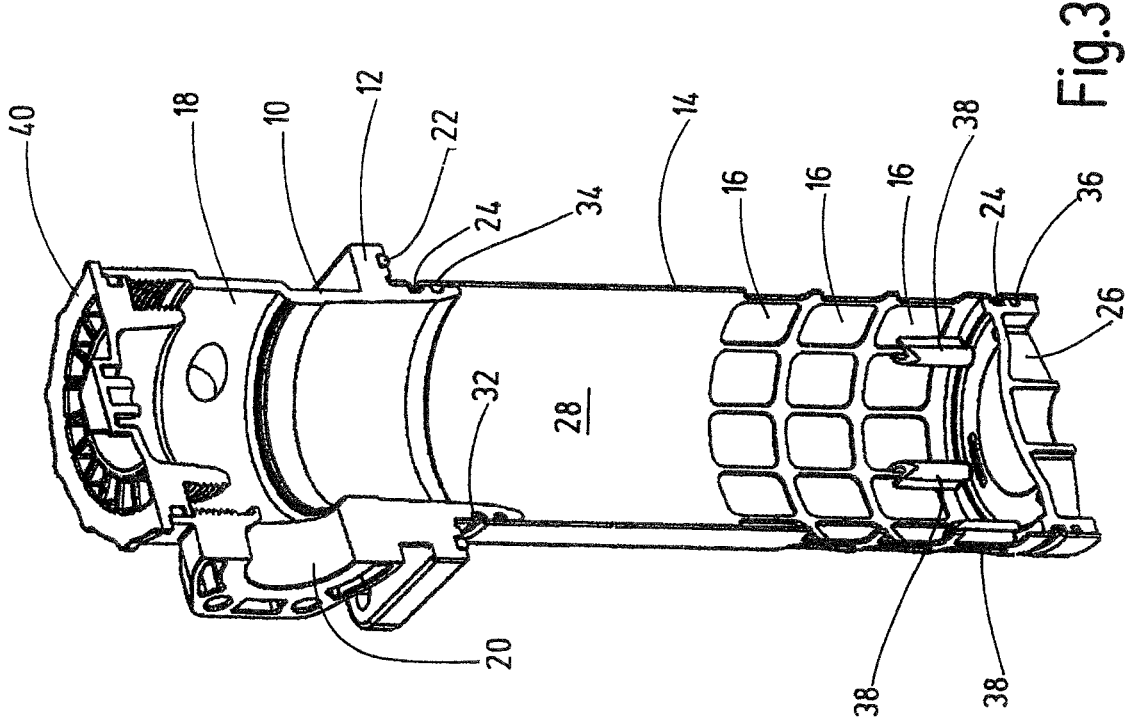
FIG. 3 is a perspective view in section of the filter device of FIG. 1, with the filter element removed and the cover in place.

If the filter element 30 is not inserted, according to the illustration in FIGS. 3 and 4, the cover 40 can be inserted into the upper receiving opening of the filter housing 10, but the frictional adhesion via the sealing ring 46 of the cover 40 alone does not suffice for a secure attachment to the filter housing 10. Accordingly, it is not possible to put the filter device or the hydraulic system or the machine into operation without the filter element 30 being anchored in the filter housing 10 and without the cover 40 forming an effective threaded connection with the filter element 30 already attached via the threaded sections 44, 84.

As shown in particular in the illustration according to FIGS. 2 and 8, all functional elements and threaded sections 44, 50, 82, 84, respectively, are arranged in a horizontal plane transverse to the longitudinal axis of the filter device, wherein the threaded sections 44 and 84, which are assigned to each other in pairs, come into engagement with each other as the pairs of threaded sections 50 and 82. The threaded sections 44, 50, 82, 84 referred to can be continuous as shown; however, they can also be interrupted segment by segment if necessary. Furthermore, dedicated pairs of threaded sections 44 and 84 or 50, 82 should each be provided with the same thread having the same pitch; otherwise, any engagement of the assigned pairs of threaded sections would not be possible. Preferably, all the threaded sections 44, 50, 82, 84 used may also be formed from one type of thread having the same thread pitch.

With great advantage, therefore, the two part element cap 58—having the element mount 72 constituting one part and the spacer 78 together with the locating ring 80 constituting the other part and open at the top, is provided in the area of the locating ring 80 with a male thread 82 for attaching the element in the filter housing 10 and with a female thread 84 for attaching the cover 40, the threaded ring 42 of which in this respect engages axially with the locating ring 80 along the inside of the latter. For an improved element fit, in the installed condition, the outer surface of the upper element cap 58 may be in planar contact with the assigned inner wall part of the filter housing 10. It goes without saying that the filter device solution according to the invention does not have to be restricted to in-tank filters, but can always be used where it is desired to ensure that only original filter elements are installed and that hydraulic systems and machines including their components can only be started if such an original filter element is actually mounted in the filter housing 10 of the hydraulic filter. In this respect, it is also possible to reverse the filtration direction from the inside to the outside to the direction from the outside to the inside.

The subject matter of the patent is therefore also a replaceable filter element as such, characterized in that an element material 52 has at least one end cap 58, which, held at an axial distance via a spacer 78, bears a locating ring 80, which has functional elements on the inner periphery and on the outer periphery, in particular in the form of the threaded sections 82 and 84, respectively. Based on these measures, the spare parts business remains with the original equipment manufacturer of the filter device and the user does not have to worry about failures in hydraulic machines and systems.

While one embodiment has been chosen to illustrate the invention, it will be understood by those skilled in the art that various changes and modifications can be made therein without departing from the scope of the invention as defined in the claims.

The invention claimed is:

1. A filter device for the filtration of fluids, comprising:
   a filter housing;
   a cover closing an open end of the filter housing;
   a filter element accommodated in a replaceable manner in the filter housing;
   at least one functional element on each of the cover, filter housing and the filter element in such a way that the filtration of the fluid is only possible when all functional elements interact simultaneously, each of the functional elements being a threaded section of identical design in pitch thereof between the cover and filter element and between filter element and filter housing, respectively; and
   one end cap of the filter element facing the cover and bearing a locating ring having a threaded section on each of inner and outer circumferential sides thereof.

2. The filter device according to claim 1 wherein the threaded sections are continuous threaded sections.

3. A filter device for the filtration of fluids, comprising:
   a filter housing;
   a cover closing an open end of the filter housing;
   a filter element accommodated in a replaceable manner in the filter housing;
   at least one functional element on each of the cover, filter housing and the filter element in such a way that the filtration of the fluid is only possible when all functional elements interact simultaneously, each of the functional elements being a threaded section of identical design in pitch thereof between the cover and filter element and between filter element and filter housing, respectively, the threaded sections are being arranged concentrically and at a same axial location with respect to each other in an operating state relative to a longitudinal axis of the filter housing; and in its operating state, viewed from an inside to an outside of the filter housing, a female thread of the filter element following a male thread of the cover, and a female thread of the filter housing following a male thread of the filter element, each of the male and female threads having respective individual thread lengths thereof as the functional elements.

4. The filter device according to claim 1 wherein the one end cap has a spacer that keeps the locating ring at an axial distance from element material of the filter element.

5. The filter device according to claim 4 wherein the spacer has fluid passages in such a way that unfiltered matter flowing into the filter housing passes into an interior of the filter element and, after flowing through the element material from an inside to an outside of the element material, flows to a filtrate side of the filter housing in a clean state.

6. The filter device according to claim 4 wherein the one end cap together with the spacer and the locating ring has a seal on an outer circumference thereof in such a way that in an operating state of the filter element in the filter housing outside the element material an unfiltered matter side of the filter housing is sealed off from an filtrate side of the filter housing.

7. The filter device according to claim 1 wherein the threaded sections are arranged concentrically and at a same axial location with respect to each other in an operating state relative to a longitudinal axis of the filter housing; and in its operating state, viewed from an inside to an outside of the filter housing, a female thread of the filter element follows a male thread of the cover, and a female thread of the filter housing follows a male thread of the filter element, each of the male and female threads having respective individual thread lengths thereof as the functional elements.

8. The filter device according to claim 1 wherein the filter housing, the cover and the filer element are designed as an in-tank filter capable of discharging unfiltered matter supplied outside of a tank, cleaning the unfiltered matter by the filter element so as to form a filtrate to flow into an inside of the tank.

9. The filter device according to claim 3 wherein one end cap of the filter element faces the cover and bears a locating ring having a threaded section on each of inner and outer circumferential sides thereof.

10. A filter element replaceably mountable in a filter housing with a cover closing an open end of the filter housing of a filter device, the filter element comprising:
at least one functional element on the filter element engageable with functional elements on the filter housing and the cover in such a way that the filtration of fluid is only possible when all functional elements interact simultaneously, the functional elements being threaded sections of identical design in pitch thereof between the cover and filter element and between filter element and filter housing, respectively;
an element material having at least one end cap, the one end cap being connected to a locating ring by and held at an axial distance from the one end cap by a spacer, the locating ring having the threaded sections of the filter element on an inner circumference and on an outer circumference thereof forming the functional element on the filter element of identical design in pitch thereof with the threaded sections of the filter element being capable being between the cover and the filter element and between the filter element and the housing.

* * * * *